United States Patent
Lambrecht et al.

(10) Patent No.: US 6,594,870 B1
(45) Date of Patent: Jul. 22, 2003

(54) PANEL FASTENER

(75) Inventors: Martin Lambrecht, Holland, MI (US); Andrew Johnston, Grand Rapids, MI (US); Kathy J. Jackson, Davisburg, MI (US); Nicholas Jackson, Jr., Davisburg, MI (US); Shawn E. Roberts, Clarkston, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/767,179

(22) Filed: Jan. 22, 2001

(51) Int. Cl.[7] .................. F16B 21/00; A44B 21/00
(52) U.S. Cl. ................. 24/297; 24/453; 24/458; 411/48
(58) Field of Search ................. 24/297, 458, 453; 411/908, 48, 508, 510, 339, 913; 403/408.1, 407.1

(56) References Cited

U.S. PATENT DOCUMENTS

| 3,249,973 A | 5/1966 | Seckerson |
| --- | --- | --- |
| 3,771,275 A | 11/1973 | Seckerson |
| 4,312,165 A | 1/1982 | Mizusawa |
| 4,420,859 A | 12/1983 | Hammerle |
| 4,499,636 A | 2/1985 | Tanaka |
| D297,615 S | 9/1988 | Nakama |
| 4,861,208 A | 8/1989 | Boundy |
| 5,173,026 A | 12/1992 | Cordola |
| 5,291,639 A | 3/1994 | Baum |
| 5,419,606 A | 5/1995 | Hull |
| 5,507,610 A | 4/1996 | Benedetti |
| 5,551,817 A | 9/1996 | Kanie |
| 5,577,301 A | 11/1996 | De Maagd |
| 5,636,891 A | 6/1997 | Van Order et al. |
| 5,647,713 A | 7/1997 | Ge |
| 5,689,863 A | 11/1997 | Sinozaki |
| 5,846,039 A | * 12/1998 | Kirchen et al. ........ 411/48 X |
| 5,975,820 A | 11/1999 | Kirchen |

* cited by examiner

Primary Examiner—Robert J. Sandy
(74) Attorney, Agent, or Firm—Price, Heneveld, Cooper, DeWitt & Litton

(57) ABSTRACT

A fastener for coupling a trim panel to a support member includes a mounting grommet with a funnel-shaped receiver communicating with an aperture for receiving one end of a fastener pin having a plurality of spaced annular ratcheting grooves formed thereon. The opposite or second end of the pin includes a pointed end with a pair of resilient locking arms, which extend divergently outwardly and away from an apex of the second end of the pin at an acute angle and at a spacing of about 180°, for insertion into an aperture of a support structure. Interposed between the first and second ends of the fastening pin is a resilient, generally cup-shaped seal which engages a surface of the support structure opposite the locking arms for providing a seal surrounding the aperture in the support structure to which the fastening pin is inserted. The grommet includes an annular slot defined by a collar on one side and a shoulder of the funnel-shaped receiver on the other. The shoulder includes an outwardly extending, resilient, annular flange cooperating with the support structure secured to the trim panel for centering the grommet. A trim panel includes a support socket including a slotted aperture for receiving the shoulder of the grommet and a pair of resilient locking arms which extend to one edge of the aperture for engaging the edge of the collar of the grommet when inserted into the support socket to lock the grommet in place while allowing a slight lateral adjustment for final alignment.

20 Claims, 3 Drawing Sheets

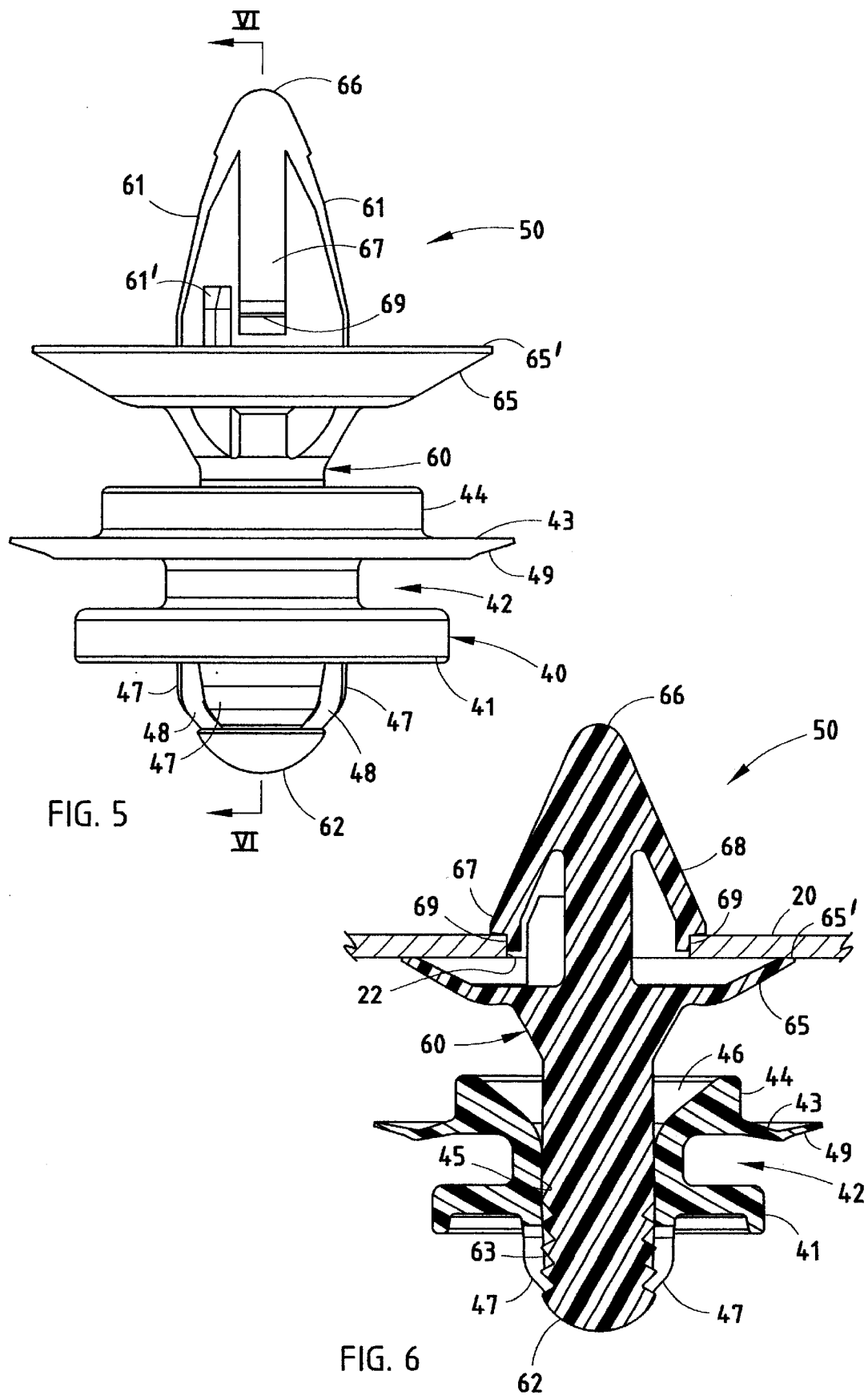

PANEL FASTENER

BACKGROUND OF THE INVENTION

The present invention relates to fasteners and particularly to fasteners for attaching a panel to a support member.

There exists a variety of polymeric fasteners employed for attaching panels to support members as, for example, in the automotive industry where a vehicle interior trim panel is attached to a structural support which can be made of sheet metal, a polymeric material, composite materials or the like, which are used in the automotive industry for doors and other vehicle components covered by trim panels. In the past, a common problem with such panels has been that during assembly fasteners, which are typically attached to a trim panel, are difficult to align to apertures in the sheet metal, and there is insufficient lateral adjustment to allow proper alignment. As a result, misaligned fasteners sometimes result in a mallet being employed to attach, for example, a door panel to a vehicle door, which can fracture the polymeric fastener. Also, overstressing the fastener during assembly or use (i.e., shutting door) or due to misalignment or due to poor fastener design may cause the fastener to break or fatigue or otherwise result in a loss in retention strength for holding the trim panel in place. As a result, door trim panels frequently become loose because of improper fastener geometry or installation.

Many fasteners are of two-piece construction including a pin and a mounting grommet which allows a panel once installed to be removed and reattached by a separating joint between the pin and grommet. The trim panel itself includes a socket referred to as a "doghouse" which receives one end of the fastener. In the past, the strength of the doghouse interface with the panel has been less than that of the separating joint between the pin and grommet, resulting in the doghouse pulling from the substrate before the fastener separates, thereby preventing reinstallation of a vehicle panel once removed for servicing a door interior part.

Other problems exist, such as when fastener pins employing annular ridges are preseated into a mounting grommet before the mounting grommet is secured within one of the panels. The subsequent seating of the other end of the pin into the support structure is. prevented by the lower insertion force between the pin and grommet. Thus, instead of properly inserting the fastener into an underlying support member, the pin slides further within the grommet. Many fasteners currently employed also require a separate foam sealant surrounding the aperture in, for example, the sheet metal support structure to prevent moisture from seeping through the sheet metal hole onto the trim panel.

As a result of all the difficulties with existent polymeric fasteners for attaching, for example, vehicle interior trim panels to vehicle sheet metal and particularly door panels to the sheet metal structure of a door, warranty claims for loose panels and broken fasteners are one of the major concerns in the automotive interior trim field. There exists a need, therefore, for a fastening assembly which will allow secure attachment of a vehicle interior trim panel to supporting sheet metal and allow assembly line techniques with the proper alignment of the fasteners with both the trim panel and support member as well as allow the panel to be removed and reinstalled without damaging the trim panel or the fastener. Also, the fastener should maintain the panel securely in place during use including, for door panels, when a door is slammed shut.

SUMMARY OF THE INVENTION

The fastener of the present invention meets these needs by providing a mounting grommet which includes a funnel-shaped receiver communicating with an aperture for receiving one end of a fastener pin having a plurality of spaced annular ratcheting grooves formed thereon. The opposite or second end of the pin is pointed and includes at least one resilient locking arm for insertion into an aperture in the support structure. Interposed between the first and second ends of the fastening pin is a resilient, generally cup-shaped seal which engages a surface of the support structure opposite the locking arm for providing a seal surrounding the aperture in the support structure to which the fastening pin is inserted. In a preferred embodiment, a pair of locking arms extend divergently outwardly and away from an apex of the second end of the pin at an acute angle and at a spacing of about 180° and terminate in ends which snap-fit to the edge of the aperture into which the pin is extended under the compressive force of the seal. In a preferred embodiment also, the grommet further includes an annular slot defined by a collar on one side and a shoulder of the funnel-shaped receiver on the other. The shoulder includes an outwardly extending, resilient, annular flange cooperating with the support structure secured to the trim panel for centering the grommet.

In one embodiment of the invention, a trim panel includes a support socket to receive the annular slot of the grommet and lock the grommet in place. The support socket is defined by a slotted aperture for receiving the shoulder of the grommet and at least one resilient locking arm extending to one edge of the aperture for engaging the edge of the collar of the grommet when entered into the aperture of the support socket to lock the grommet in place while allowing two dimensions of lateral adjustment for final alignment. The support socket includes reinforcing ribs surrounding the aperture and engaging the shoulder of the grommet such that the grommet, once locked in place, will tend to self-center in the aperture.

With the structure of the present invention, therefore, an improved fastening system is provided for attaching a panel to a support member or substrate and particularly a door trim panel to the underlying support structure of the door utilizing a unique, self-aligning dual-ended fastening pin which cooperates with an improved grommet structure for receiving one end of the pin and, in one preferred embodiment, an improved trim panel with support structure for receiving the grommet and allowing self-alignment of the grommet and pin with the support structure of the vehicle.

These and other features, objects and advantages of the present invention will become apparent upon reading the following description thereof together with reference to the accompanying drawings.

BRIEF DESCRIPTION OF THE DRAWINGS

FIG. 5 is a side elevational view of the assembled pin and grommet; and

FIG. 6 is an enlarged fragmentary cross-sectional view of the structure shown in FIG. 5, taken along section lines VI—VI in FIG. 5.

DETAILED DESCRIPTION OF THE PREFERRED EMBODIMENT

Figure 1:
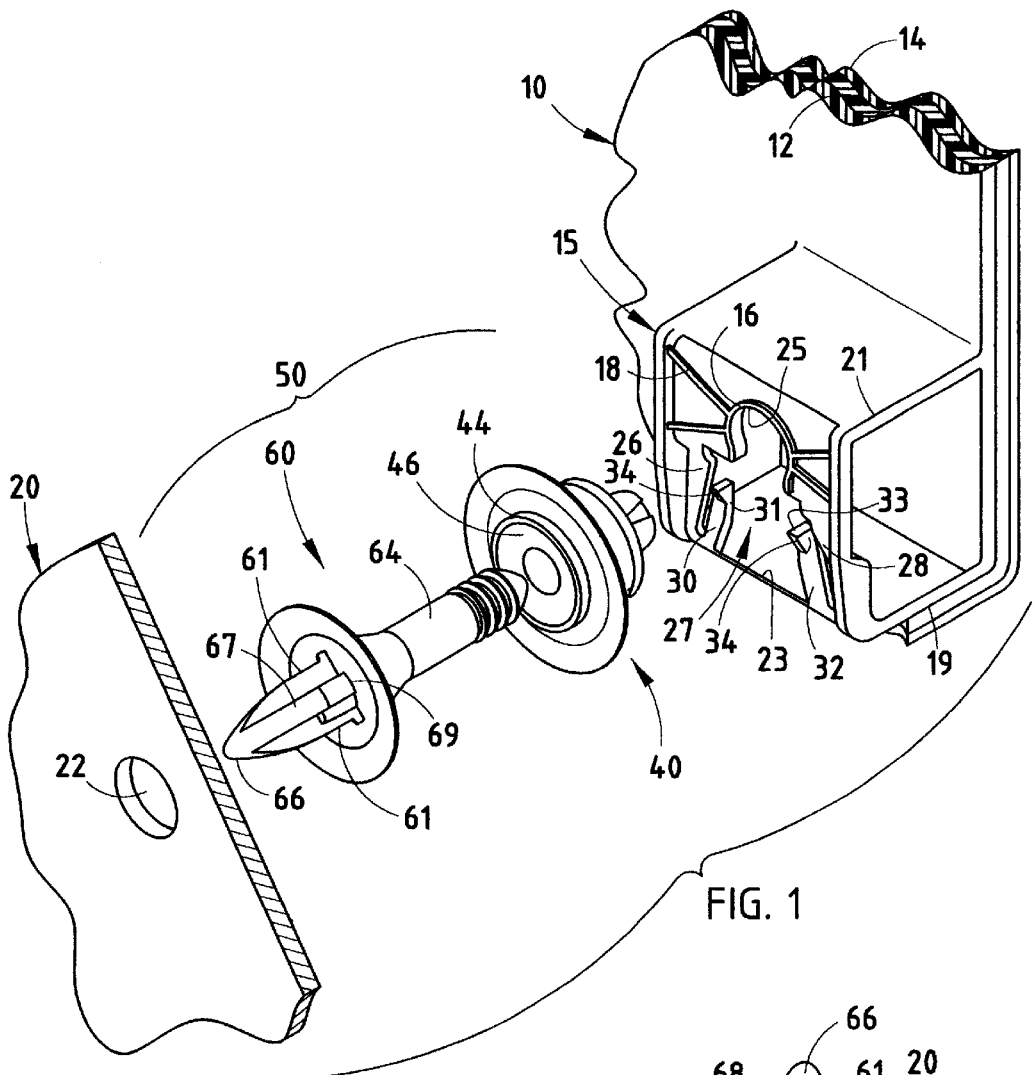
FIG. 1 is a fragmentary exploded perspective view of a vehicle trim panel and vehicle door support including the fastener of the present invention.

Referring initially to FIG. 1, there is shown a vehicle door trim panel 10 which typically includes an outer decorative surface 14 facing the interior of the vehicle and an inner surface 12 facing the vehicle door and which integrally includes a plurality of fastener sockets 15. The sockets 15 are located at various positions around the periphery of the door panel 10 and are frequently referred to as "doghouses". Each socket receives a fastener 50 for attaching the trim panel 10 to the underlying support 20 of a door, which support can be sheet metal or another suitable material. The fastener 50 of the present invention comprises a grommet 40 and a pin 60, which are releasably coupled together as best seen in FIGS. 5 and 6. A first end of pin 60 releasably engages grommet 40 which, in turn, is lockably mounted within an associated socket 15. The second end of pin 60 is lockably extended into aperture 22 of support member 20. The pin, once installed, remains in support 20 while the grommet releases from the first end of pin 60, if panel 10 is detached for servicing of the vehicle door. Having briefly described the components of the fastener of the present invention and its relationship to the other components, a detailed description of the fastener and fastening system, including the improved socket design, follows.

Typically, a door panel 10 will include a plurality of spaced-apart sockets 15 located at, for example, the corners and midway along the edges of the panel and perhaps at critical areas in the center area of the door panel where structural support is necessary, such as armrests, switch housings, and the like. Socket 15 shown in the preferred embodiment of the invention includes a wall 16 with a plurality of reinforcing ribs 18 extending radially inwardly from the outer edges of the sidewalls 19 and 21 toward a keyed aperture 25. Aperture 25 comprises a generally circular opening in wall 16 with an open edge 27 for lockably receiving grommet 40 as described in greater detail below. The socket includes inclined surfaces 26 and 28 extending between wall 19 and wall 16 for camming the grommet into aperture 25. A pair of resilient arms 30, 32 extend toward aperture 25 from the top edge 23 of wall 19. Arms 30, 32 have tips 31, 33, respectively, which engage and lock the grommet in place once inserted into the keyed aperture 25. Tips 31, 33 of arms 30, 32, respectively, have inclined camming surfaces 34 to assist in deflecting the arms as grommet 40 is snap-locked into aperture 25. The socket 15 typically is integrally molded of a suitable polymeric material and integrally formed with the door panel 10 or otherwise suitably attached thereto by ultrasonic welding, adhesive bonding, or the like.

Figure 2:
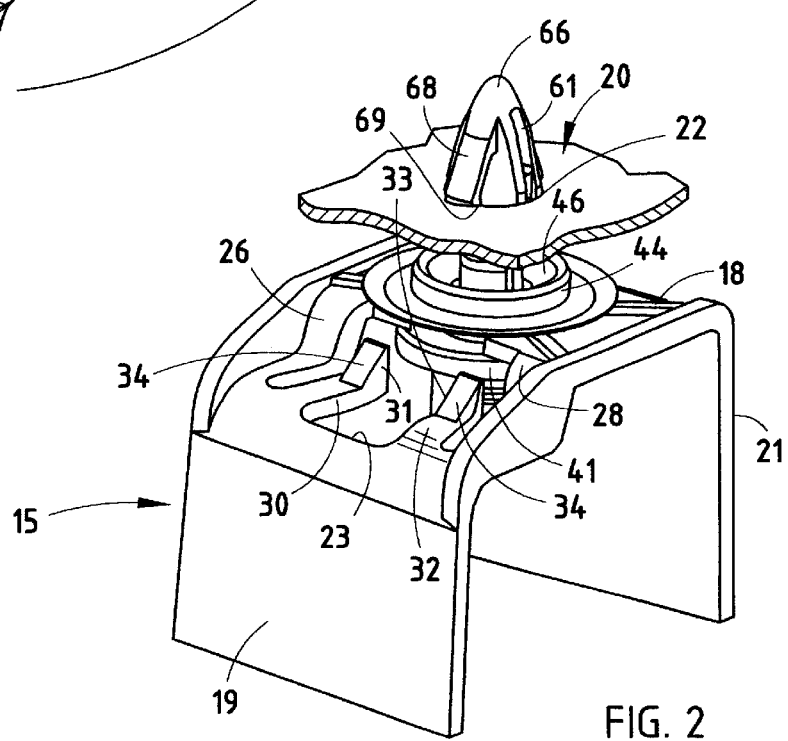
FIG. 2 is an enlarged fragmentary perspective assembled view of the structure shown in FIG. 1.

The fastener 50 of the present invention includes the grommet 40 and a dual-ended fastening pin 60. The grommet 40 includes an annular slot 42 (FIG. 5), which is bounded on the lower end (as viewed in FIG. 5) by collar 41 and an upper end by funnel-shaped receiver 44 having a cylindrical aperture 45 with a relatively large open mouth 46 (FIG. 6) for receiving a first end 62 of pin 60. Grommet 40 has inwardly tapered legs 47 at the end of aperture 45 with tips for engaging annular serrated ratchets 63 on end 62 of pin 60. Legs 47 are defined by spaced longitudinal slots 48 (FIG. 5) in the sidewall of grommet 40. The shoulder 44 of grommet 40 includes an outwardly extending annular flange 43 (FIGS. 5 and 6) with an upturned annular outer camming surface 49 which engages ribs 18 of socket wall 16 tending to center grommet 40 in aperture 25 once lockably inserted therein. The diameter of the cylindrical wall of annular slot 42 is selected to be about 3 mm to 6 mm smaller than the diameter of aperture 25 to allow the grommet to float slightly in the doghouse to permit easy alignment and insertion of pin 60 into support 20 as described below. The tips of resilient arms 31, 33 engage the cylindrical sidewall of collar 41 (FIG. 2) to lock the grommet in aperture 25 once inserted.

Pin 60 comprises a generally elongated cylindrical body 64 (FIG. 1) with a cup-shaped seal 65 interposed between first end 62 and elongated tapered, inverted W-shaped locking end 66. The end 66 includes a pair of opposed downwardly depending, outwardly extending resilient locking arms 67, 68 (from top to bottom as seen in FIG. 6) at an angle of from about 25° to about 40°. Arms 67, 68 include notches 69 on each of their ends for engaging the edge of the rectangular sheet metal aperture 22, as best seen in FIG. 6. Triangular ribs 61, spaced 90° from arms 67, 68, reinforce end 66 while a vertical rib 61' stabilizes each arm 67, 68, preventing lateral deflection during insertion into the mating aperture 22.

The resilient cup-shaped seal 65 includes an annular edge 65' engaging the surface of the sheet metal support 20 opposite first or locking end 66 of pin 60, sealing the aperture 22 into which the pin 60 is inserted through the sheet metal support 20, thereby preventing moisture from entering the area of the trim panel 12. The pin 60 is preferably integrally molded of nylon 46, while grommet 40 is preferably integrally molded of acetal, although either member may be made of other suitable polymeric materials typically employed for fasteners in the automotive field.

Figure 3:
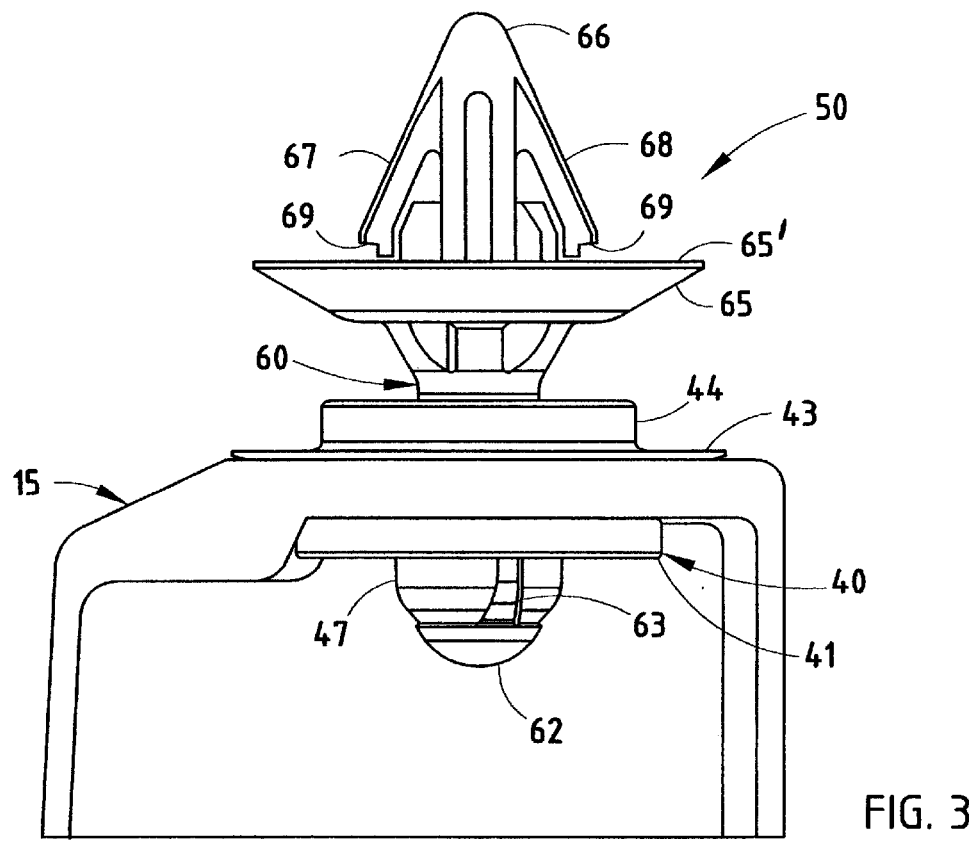
FIG. 3 is a side elevational view of the fastener installed in the panel socket shown in a first position.

In practice, the fastener manufacturer will typically manufacture the components, including grommet 40 and pin 60 of fastener 50 as seen in FIGS. 5 and 6. The manufacturer may also be a manufacturer of the door panels 10 and, in such case, will typically insert the grommets 40 into the sockets 15 in an initial position as seen in FIG. 3 for shipment of the door panel 10 with a plurality of fasteners 50 mounted thereto such that the automotive manufacturer need only press the panel with tapered pin end 66, fitting into apertures 22 of the support sheet metal for a given vehicle. Naturally the sockets 15 are positioned on the door panel according to the manufacturer specifications to provide alignment with the apertures 22 in the underlying door mounting structure 20. The relatively thin ribs 61 of pin end 66 tend to rotate the pin with respect to the grommet to the proper aligned position with the ribs 61 extending through the elongated dimension of the rectangular aperture, thereby compressing the resilient arms 67, 68 as the panel is pressed into an installed position.

Figure 4:
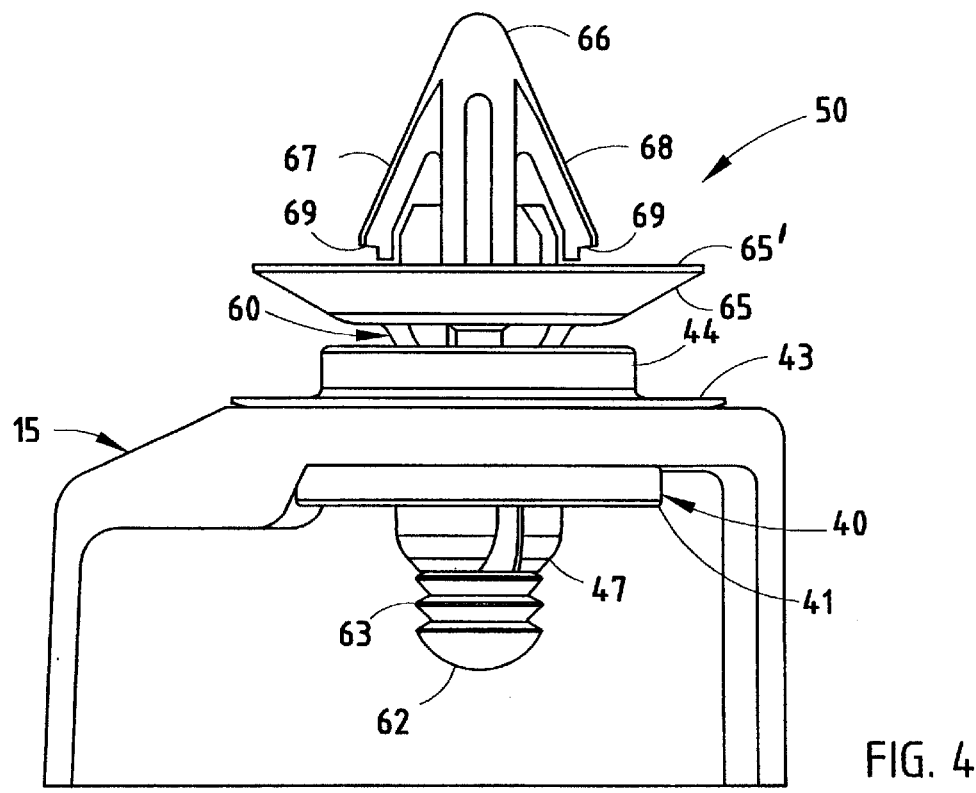
FIG. 4 a side elevational view of the fastener installed in the panel socket shown in a second position.

The pair of opposed, deflectable arms 67, 68 are dimensioned to be received in the aperture 22 of sheet metal 20 relatively easily. Once in place and the flange 65' of seal 65 compressibly engages the sheet metal 20 on a side opposite tips 69 of arms 67, 68, the end 66 of pin 60 is securely held to the sheet metal. The sharp taper of end 66 provides the relatively easy insertion of the pin to the sheet metal. The preassembly of fastener 50 is facilitated by the funnel-shaped receiver 44 of each of the grommets 40 as the rounded tip 62 of pin 60 engages the conically tapered opening 46 of the receiver 44 of grommet 40. The grommet will center itself on pin end 62 and the grommet within the aperture 25 of the doghouse sufficiently to allow alignment. Upon installation of the door panel 10 and further pressing of panel 10 toward panel 20, the ratchets 63 will engage the tips of legs 47 of the grommet only after arms 67, 68 are fully inserted and locked into place in member 20. The spacing of door panel 10 to the door support 20 can then be adjusted for a tighter fit by the first end 62 of pin 60 further extending into grommet 40, as illustrated in FIG. 4.

The alignment of the pin to grommet and grommet to socket provides a relatively easy preassembly of the fastener parts to each other and the resultant fastener to the socket. The ratchets 63 are shaped and dimensioned with intersecting inclined surfaces to provide insertion forces into the grommet 40 greater than the insertion force of arms 67, 68 into support 20, thereby assuring that pin 60 will be anchored to the vehicle door support 20. Subsequently, legs 47 (FIG. 6) engage the downwardly inclined surfaces of ratchet grooves 63 to allow panel 10 to be removed by separating pin 60 from grommet 40 with a force of from about 30 to about 60 pounds. The insertion forces for assembling pin 60 to grommet 40 are much lower and in the neighborhood of about 20 pounds due to the shallow angle of inclination of the upwardly inclined (FIG. 6) surfaces of ratchet grooves 63 compared to the downwardly inclined locking surfaces (about 30° as compared to about 45°).

The fastener 50, therefore, of the present invention provides an improved, highly reliable, easily installed fastener which can be combined with an improved socket 15 to provide a door panel and fastening system which virtually eliminates broken fasteners during installation and loose or failed fasteners after installation of the door panel. This construction also permits door or other vehicle panels to be removed for repair of underlying structure and subsequently reinstalled with no loss of performance.

It will become apparent to those skilled in the art that various modifications to the preferred embodiment of the invention as described herein can be made without departing from the spirit or scope of the invention as defined by the appended claims.

The invention claimed is:

1. A fastener for attaching a panel to a support member comprising:

a grommet having an annular groove for attachment to a panel, said grommet including an aperture extending there through in a direction generally orthogonal to said annular groove, said grommet including a conically tapered opening at one end which communicates with said aperture for receiving a fastening pin therein, said grommet further including at least one leg at an opposite end of said aperture and extending into said aperture; and a fastening pin having one end which is pointed and which includes annular longitudinally spaced ratchet grooves at said one end, and a generally pointed opposite end including at least one resilient outwardly extending locking arm extending away from said generally pointed end, wherein said pin is inserted into said grommet with said ratchet grooves engaging said leg of said grommet for releasably holding said pin to said grommet.

2. The fastener of claim 1 wherein said annular groove of said grommet is defined by a collar adjacent said leg of said grommet and an annular shoulder spaced from said collar.

3. The fastener of claim 2 wherein said annular shoulder has an annular camming surface.

4. The fastener of claim 1 wherein said pin includes a resilient annular seal interposed between said one end and said opposite end.

5. The fastener of claim 4 wherein said ratchet grooves are defined by first and second intersecting inclined surfaces with one of said surfaces inclined at a first angle promoting easy insertion of said pin into said grommet and the second inclined surface inclined at a different angle to resist removal of said pin from said grommet at forces less than about 30 pounds.

6. The fastener of claim 5 wherein said generally pointed opposite end of said pin includes a pair of opposed resilient locking arms which extend divergently outwardly from said opposite end.

7. The fastener of claim 6 and further including reinforcing ribs extending in opposition to one another between said locking arms.

8. A vehicle door trim panel and fastener assembly for attaching the panel to a door support member comprising:

a door trim panel having a decorative side for facing the interior of a vehicle and an opposite side for facing a vehicle door, said panel including at least one support socket mounted to said opposite side of said door panel for receiving a grommet, said socket including a slotted aperture and at least one resilient locking arm having an end extending adjacent said slotted aperture;

a grommet having an annular groove for insertion into said slotted aperture, said grommet including an aperture extending there through in a direction generally orthogonal to said annular groove, said groove of said grommet cooperating with said slotted aperture and said locking arm for lockably mounting said grommet into said socket;

said mounting grommet including a conically tapered opening at one end which communicates with said aperture for receiving a fastening pin therein, said grommet further including at least one leg at an opposite end of said aperture and extending radially into said aperture; and a fastening pin including annular longitudinally spaced ratchet grooves at one end and a generally pointed opposite end including at least one resilient outwardly extending locking arm extending away from said generally pointed end, wherein said pin is inserted into said grommet with said ratchet grooves engaging said legs of said grommet for releasably holding said pin to said grommet.

9. The assembly of claim 8 wherein said annular groove of said grommet is defined by a collar adjacent said leg of said grommet and an annular shoulder spaced from said collar.

10. The assembly of claim 9 wherein said annular shoulder has an annular camming surface.

11. The assembly of claim 8 wherein said pin includes a resilient annular seal interposed between said one end and said opposite end.

12. The assembly of claim 11 wherein said ratchet grooves are defined by first and second intersecting inclined surfaces with one of said surfaces inclined an a first angle promoting easy insertion of said pin into said grommet and the second inclined surface inclined at an angle to resist removal of said pin from said grommet at forces less than about 30 pounds.

13. The assembly of claim 12 wherein said generally pointed end of said pin includes a pair of opposed resilient locking arms which extend divergently outwardly from said generally pointed end.

14. The assembly of claim 13 and further including reinforcing ribs extending in opposition to one another between said locking arms.

15. A polymeric two piece fastener for releasably attaching a panel to a support member comprising:

a grommet having a collar and an annular flange spaced from said collar to define an annular groove therebetween for attachment of said grommet to a panel, said grommet including an aperture extending longitudinally there through in a direction generally orthogonal to said annular groove, said aperture including a conically tapered opening at one end for receiving a fastening pin therein, said grommet further including at least one leg at an opposite end of said aperture and extending radially into said aperture; and a fastening pin having one end which is pointed and which includes annular longitudinally spaced ratchet grooves at said one end and a generally pointed opposite end including at least one resilient outwardly extending locking arm extending away from said generally pointed end, wherein said one end of said pin can be inserted into said grommet with said ratchet grooves engaging said leg of said grommet for releasably holding said pin to said grommet.

16. The fastener of claim 15 wherein said opposite end of said pin includes a pair of opposed locking arms each extending divergently outwardly from said opposite end at an angle of from about 25 degrees to about 40 degrees to facilitate insertion of said opposite end of said pin into an aperture of a support member.

17. The fastener of claim 16 wherein said opposite end of said pin further includes a rib extending longitudinally and laterally adjacent each of said locking arms for stabilizing said arms when deflected.

18. The fastener of claim 17 wherein said annular flange of said grommet includes an inclined outer annular surface for facilitating insertion of said grommet to a panel receiving member.

19. A polymeric two piece fastener in combination with a panel mounted socket for releasably attaching a panel to a support member comprising:

a grommet having a collar and an annular flange spaced from said collar to define an annular groove therebetween for attachment of said grommet to a panel, wherein said annular flange of said grommet includes an inclined outer annular surface for facilitating insertion of said grommet to a panel receiving member, said grommet including an aperture extending longitudinally there through in a direction generally orthogonal to said annular groove, said aperture including a conically tapered opening at one end for receiving a fastening pin therein, said grommet further including at least one leg at an opposite end of said aperture and extending radially into said aperture;

a fastening pin including annular longitudinally spaced ratchet grooves at one end and a generally pointed opposite end including at least one resilient outwardly extending locking arm extending away from said generally pointed end, wherein said one end of said pin can be inserted into said grommet with said ratchet grooves engaging said leg of said grommet for releasably holding said pin to said grommet, wherein said opposite end of said pin includes a pair of opposed locking arms each extending divergently outwardly from said opposite end at an angle of from about 25 degrees to about 40 degrees to facilitate insertion of said opposite end of said pin into an aperture of a support member, and wherein said opposite end of said pin further includes a rib extending longitudinally and laterally adjacent each of said locking arms for stabilizing said arms when deflected; and a socket including a slotted aperture and at least one resilient locking arm having an end extending adjacent said slotted aperture for lockably engaging said collar of said grommet when said grommet is inserted into said slotted aperture.

20. The fastener and socket of claim 19 wherein said pin of said fastener releases from said grommet with a force of from about 30 to about 60 pounds.

* * * * *

UNITED STATES PATENT AND TRADEMARK OFFICE
CERTIFICATE OF CORRECTION

PATENT NO. : 6,594,870 B1
DATED : July 22, 2003
INVENTOR(S) : Martin Lambrecht et al.

It is certified that error appears in the above-identified patent and that said Letters Patent is hereby corrected as shown below:

Column 1,
Line 41, "is." should be -- is --.

Column 2,
Line 61, after "4" insert -- is --.

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,594,870 B1
DATED : July 22, 2003
INVENTOR(S) : Martin Lambrecht et al.

It is certified that error appears in the above-identified patent and that said Letters Patent is hereby corrected as shown below:

<u>Title page,</u>
Item [73], Assignee, after "MI" insert -- and A. Raymond, Inc., Rochester Hills, MI --.

Signed and Sealed this

Sixteenth Day of March, 2004

JON W. DUDAS
*Acting Director of the United States Patent and Trademark Office*